US006431003B1

(12) United States Patent
Stark et al.

(10) Patent No.: US 6,431,003 B1
(45) Date of Patent: Aug. 13, 2002

(54) CAPACITIVE DIFFERENTIAL PRESSURE SENSOR WITH COUPLED DIAPHRAGMS

(75) Inventors: Kevin C. Stark, Richmond Heights, OH (US); Christopher A. Bang, San Diego, CA (US)

(73) Assignee: Rosemount Aerospace Inc., Burnsville, MN (US)

( * ) Notice: Subject to any disclaimer, the term of this patent is extended or adjusted under 35 U.S.C. 154(b) by 92 days.

(21) Appl. No.: 09/656,202

(22) Filed: Sep. 6, 2000

Related U.S. Application Data

(63) Continuation-in-part of application No. 09/532,244, filed on Mar. 22, 2000.

(51) Int. Cl.[7] ............................................... G01L 9/12
(52) U.S. Cl. ........................................................ 73/718
(58) Field of Search ............................. 73/718, 724, 756; 361/283.1, 283.2, 283.3, 283.4

(56) References Cited

U.S. PATENT DOCUMENTS

| | | | |
|---|---|---|---|
| 4,073,191 A | 2/1978 | Saigusa ........................ 73/706 |
| 4,261,086 A | 4/1981 | Giachino et al. ........... 29/25.41 |
| 4,565,096 A | 1/1986 | Knecht .......................... 73/718 |
| 4,581,676 A | 4/1986 | Baxter et al. ................ 361/283 |
| 4,730,496 A | 3/1988 | Knecht et al. ................. 73/724 |
| 4,735,098 A | 4/1988 | Kavli et al. .................... 73/718 |
| 4,790,192 A | 12/1988 | Knecht et al. ................. 73/721 |
| 4,835,716 A | 5/1989 | Tamaki et al. ............... 364/558 |
| 4,838,088 A | 6/1989 | Murakami .................... 73/724 |
| 4,864,463 A | 9/1989 | Shkedi et al. ................ 361/283 |
| 4,879,627 A | 11/1989 | Grantham .................... 361/283 |
| 4,903,532 A | 2/1990 | Tamai et al. ................... 73/718 |
| 4,951,174 A | 8/1990 | Grantham et al. ........... 361/283 |
| 5,056,369 A | 10/1991 | Tamai et al. ................... 73/718 |
| 5,134,887 A | 8/1992 | Bell ............................ 73/718 |
| 5,233,875 A | 8/1993 | Obermeier et al. ............ 73/718 |
| 5,316,619 A | 5/1994 | Mastrangelo ................ 156/644 |
| 5,323,656 A | 6/1994 | Fung et al. ..................... 73/718 |
| 5,332,469 A | 7/1994 | Mastrangelo ................ 156/643 |
| 5,344,523 A | 9/1994 | Fung et al. .................. 156/628 |
| 5,357,806 A | 10/1994 | Dennis et al. ................. 73/718 |
| 5,369,544 A | 11/1994 | Mastangelo .............. 361/283.4 |
| 5,431,057 A | 7/1995 | Zimmer et al. ................ 73/724 |
| 5,470,797 A | 11/1995 | Mastrangelo ................ 437/225 |
| 5,488,869 A | 2/1996 | Renaud ........................ 73/724 |
| 5,515,732 A | 5/1996 | Willcox et al. ................ 73/724 |
| 5,744,725 A | 4/1998 | Chen et al. .................... 73/724 |
| 5,936,164 A | 8/1999 | Sparks et al. .................. 73/724 |
| 5,992,240 A | 11/1999 | Tsuruoka et al. .............. 73/718 |
| 6,012,336 A | 1/2000 | Eaton et al. ................... 73/754 |
| 6,029,525 A | 2/2000 | Grudzien ...................... 73/718 |

FOREIGN PATENT DOCUMENTS

EP 0744603 11/1996

OTHER PUBLICATIONS

PCT International Search Report; PCT Application No. PCT/US 00/07646; filed on Mar. 23, 2000.

Primary Examiner—William Oen
(74) Attorney, Agent, or Firm—Thompson Hine LLP

(57) ABSTRACT

A pressure sensor for measuring the differential pressure of a first and a second fluid. The sensor includes a housing having an internal opening, a first diaphragm disposed in the opening and exposed to the first fluid, and a second diaphragm disposed in the opening and exposed to the second fluid. The first diaphragm and the second diaphragm are each made of a conductive material and coupled together such that the differential pressure of the first and second fluids deflects the first and second diaphragms in the same direction. The deflection of the first and second diaphragms can be sensed to determine the differential pressure.

35 Claims, 5 Drawing Sheets

CAPACITIVE DIFFERENTIAL PRESSURE SENSOR WITH COUPLED DIAPHRAGMS

This application is a continuation-in-part of U.S. Ser. No. 09/532,244, filed Mar. 22, 2000, the contents of which are hereby incorporated by reference.

BACKGROUND OF THE INVENTION

The present invention is directed to pressure sensors, and more particularly, to micromachined differential pressure sensors.

Differential pressure sensors are used in a wide variety of settings to compare the relative pressures of two fluids. Most existing differential pressure sensors include a pair of diaphragms mounted in a housing, and each diaphragm is exposed to the pressure of one of the fluids. The pressure of each fluid independently deflects the associated diaphragm such that the pressure of each fluid can be calculated, for example, using a look-up chart referencing the deflection of each diaphragm. The difference in pressure of the two fluids may then be calculated. However, the use of two conventional capacitive sensor to measure differential pressure may not consistently provide accurate results.

Micromachining techniques are often used to form transducers used in conjunction with small components or in confined spaces. However, most existing differential pressure sensors cannot be used to measure high common pressure, are relatively large and expensive, and typically include a metallic or ceramic diaphragm. Metallic or ceramic diaphragms are relatively inflexible and difficult to machine. Furthermore, the gap of the capacitor in existing capacitive pressure sensors may be exposed to a media, which can compromise the accuracy of the sensor. Accordingly, there is a need for a improved differential pressure sensor, and a quick and inexpensive method for manufacturing a micromachined differential pressure sensor. There is also a need for a micromachined differential pressure sensor that can accurately measure differential pressure.

SUMMARY OF THE INVENTION

The present invention is a micromachined capacitive differential pressure sensor which includes a pair of diaphragms, each diaphragm being exposed to a fluid. The diaphragms are coupled together for movement, thereby increasing the accuracy of the sensor and reducing the sensitivity of the sensor to common pressure. The sensor is also relatively easy and inexpensive to manufacture. The gap between the capacitors is not exposed to the external media, thereby providing a stable capacitance value.

In a preferred embodiment, the invention is a pressure sensor for measuring the differential pressure of a first and a second fluid. The sensor includes a housing having an internal opening, a first diaphragm disposed in the opening and exposed to the first fluid, and a second diaphragm disposed in the opening and exposed to the second fluid. The first diaphragm and the second diaphragm are each made of a conductive material and coupled together such that the differential pressure of the first and second fluids deflects the first and second diaphragms in the same direction. The deflection of the first and second diaphragms can be sensed to determine the differential pressure.

Other objects and advantages of the present invention will be apparent from the following description and the accompanying drawings.

DETAILED DESCRIPTION

Figure 1:
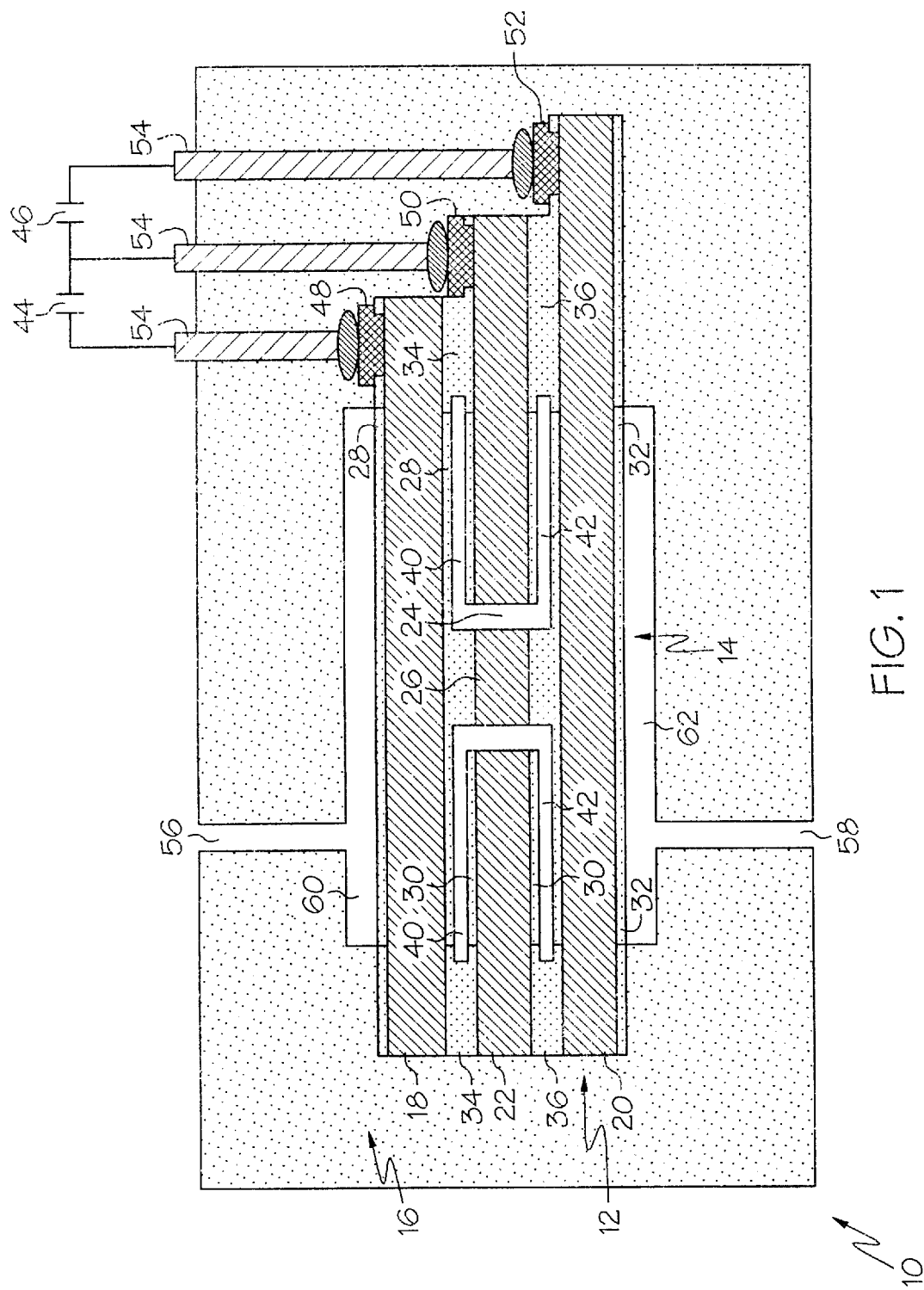
FIG. 1 is a side cross-section view of one embodiment of the sensor of the present invention.

As shown in FIG. 1, the sensor 10 of the present invention includes a transducer 12 mounted inside an internal opening 14 of non-conductive housing 16. The pressure sensor 10 includes an upper diaphragm 18 and a lower diaphragm 20. A generally conductive spacer 22 is located between the two diaphragms 18, 20, and the spacer 22 has a central opening 24 formed therein. A post 26 is coupled to the upper 18 and lower 20 diaphragms and extends through the opening 24. The upper and lower diaphragms 18, 20 and the spacer 22 are preferably made of generally uniformly doped silicon (preferable P+ and alternative N+). However, the upper and lower diaphragms 18, 20 and the spacer 22 may be made from nearly any conductive material, preferably a conductive material that can be etched using standard micromachining etching techniques.

The upper and lower diaphragms 18, 20 and spacer 22 each include an outer coating 28, 30, 32, such as silicon dioxide (or "oxide"), on their outer surfaces. The thickness of the outer coatings 28, 30, 32 is exaggerated in the accompanying drawings for illustrative purposes. The outer coatings 28, 30, 32 need not be silicon dioxide, but may be any type of electrically conductive coating. Each of the upper and lower diaphragms 18, 20 include an inwardlyextending portion 34, 36 extending around the perimeter of the upper and lower diaphragms. The inwardly-extending portions 34, 36 are preferably made from the same material as the oxide layers 28, 30, 32, and extend inwardly towards, and are bonded to or otherwise coupled to the outer perimeter of the spacer 22. The thickness of the inwardly-extending portions 34, 36 is also exaggerated for illustrative purposes. The inwardly-extending portions 34, 36 space the upper 18 and lower 20 diaphragms away from the spacer 22, thereby forming an upper cavity 40 and a lower cavity 42.

The pressure sensor 10 includes an upper bonding pad 48 electrically coupled to the upper diaphragm 18, a spacer bonding pad 50 electrically coupled to the spacer 22, and a lower bonding pad 52 electrically coupled to the lower diaphragm 20. The pressure sensor 10 further includes a set of wires 54 extending from each bonding pad 48, 50, 52 to a processor (not shown).

The upper and lower cavities 40, 42 are in fluid communication with the central opening 24 in the spacer 22, and the central opening 24 and upper and lower cavities 40, 42 are filled with a dielectric material such as a dry, inert gas, or preferably a vacuum. In this manner, the upper diaphragm 18 and spacer 22 form an upper capacitor 44, and the lower diaphragm 20 and spacer 22 form a lower capacitor 46. The upper and lower diaphragms may have a variety of shapes in top view, such as square or circular.

Preferably, the upper diaphragm 18, spacer 22, and lower diaphragm 20 have different widths (i.e., the left-to-right dimension in FIG. 1) to improve the ease of connecting the wires 54. For example, as shown in FIG. 1, the upper diaphragm 18 has a smaller width as compared to the spacer 22. This ensures that the upper diaphragm 18 does not entirely cover the spacer, and provides a surface area upon which the spacer bonding pad 50 may be located. Similarly, the upper diaphragm 18 and spacer 22 have a smaller width as compared to the lower diaphragm 20 to provide a surface for the deposition of the lower bonding pad 52. Besides having different widths, each component 18, 20, 22 may have different surface areas or foot prints, or may be stacked in an offset manner, to create an uncovered surface for each of the diaphragms 18, 20 and spacer 22 to receive a bonding pad thereon.

The housing 16 includes a pair of fluid inlet openings 56, 58 and fluid entry chambers 60, 62. In operation, an upper fluid flows through the upper fluid inlet opening 56, fills the upper fluid entry chamber 60, and exerts pressure upon the upper diaphragm 18. Similarly, a lower fluid enters through the lower fluid inlet opening 58, fills the lower fluid entry chamber 62, and exerts pressure on the lower diaphragm 20. The upper and lower diaphragms 18, 20 isolate the spacer 22 and upper and lower cavities 40, 42 from the upper and lower fluids, respectively. In an alternate embodiment (not shown), the housing 16 does not include any fluid inlet openings 56, 58 or fluid entry chambers 60, 62. In this case, the transducer 12 is mounted in a housing such that the upper and lower diaphragms 18, 20 are directly exposed to the fluids to be measured. In yet another embodiment, the transducer 12 may be mounted inside a housing that is filled with a pressure transmitting medium such that the diaphragms 18, 20 are isolated from the upper and lower fluids.

A differential pressure between the upper and lower fluids causes the upper and lower diaphragms 18, 20 to move either upwardly or downwardly in FIG. 1. Because the upper and lower diaphragms 18, 20 are coupled together by the post 26, they move either upwardly or downwardly together. The spacer 22 is fixed to the housing 16 and does not move when the diaphragms 18, 20 are deflected.

Movement of the upper and lower diaphragms 18, 20 causes a change in capacitance in the upper and lower capacitors 44, 46, which is detected and measured by the processor. The change in capacitance is then converted to a differential pressure between the upper and lower fluids by a formula or look-up table, and the differential pressure is then provided as an output of the processor. In this manner, the change in capacitance of the upper and lower capacitors 44, 46 can be converted into a deflection of the diaphragms 18, 20, which can in turn be used to calculate the differential pressure of the fluids. These calculations may be performed by an external processor using, for example, mathematical equations or look-up tables.

FIGS. 2–12 illustrate a preferred method for forming the transducer 12 shown in FIG. 1, although various other methods of forming the transducer may be used without departing from the scope of the invention. The transducer 12 is preferably batch processed such that a plurality of transducers are formed on a single wafer or wafers simultaneously. However, for ease of illustration, FIGS. 2–12 illustrate only a single transducer 12 being formed on a wafer or wafers.

Figure 2:
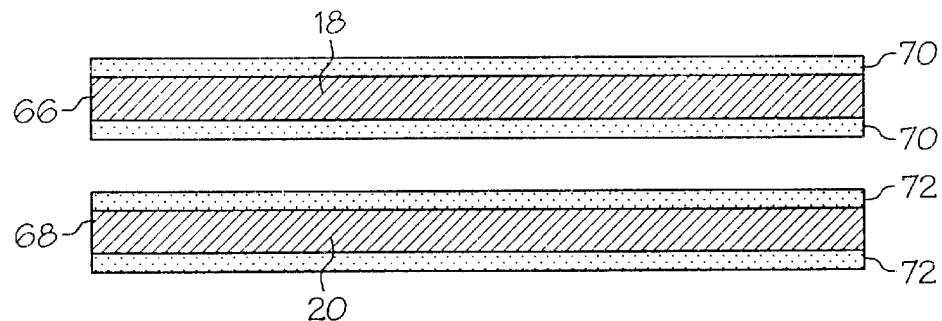
FIGS. 2–12 are a series of section views showing a preferred method for manufacturing the sensor of FIG. 1.
Figure 3:
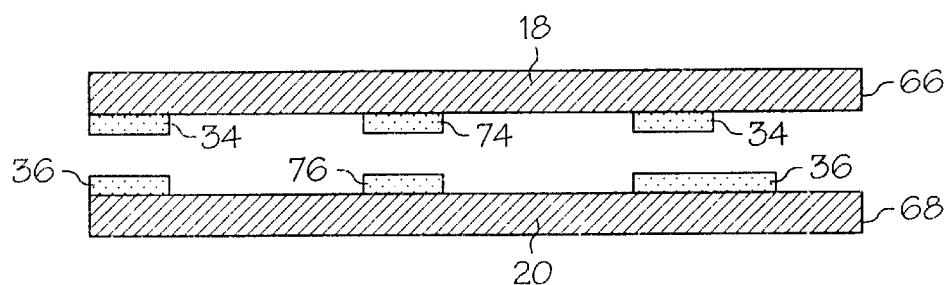

As shown in FIG. 2, the process begins with an upper doped silicon wafer 66 and a lower doped silicon wafer 68. Each wafer 66, 68 is oxidized, preferably by growing an oxide layer 70, 72 thereon, such as thermal silicon dioxide. In a preferred embodiment, the wafers 66, 68 are P+ double-side polished 100 mm single-crystal silicon wafers having a thickness of 400 microns, and the oxide layers are about 2 microns thick.

The oxide layers of each wafer 66, 68 are then etched (FIG. 3) to form the forwardly extending portions 34, 36, which will ultimately form the outer walls of the upper and lower cavities 40, 42. The oxide layers 70, 72 are also etched to form a pair of post bases 74, 76 on the upper and lower wafers 66, 68. The oxide growth, patterning and delineation at this step is critical because it defines the effective diameter of the diaphragms 18, 20 (i.e., the left-to-right distance in FIG. 1 between the forwardly-extending portions 34 and the left-to-right distance between the forwardly-extending portions 36) and the nominal capacitance of the sensor 10 (for example, a thinner oxide 70, 72 or 34, 36 decreases the distance between the electrodes and subsequently increases the nominal capacitance of the sensor 10). The oxide layers 70, 72 can be patterned by photolithography and/or etched by any variety of etching methods, such as hydrofluoric acid, buffered hydrofluoric acid (BHF), or other common etching techniques.

Figure 4:
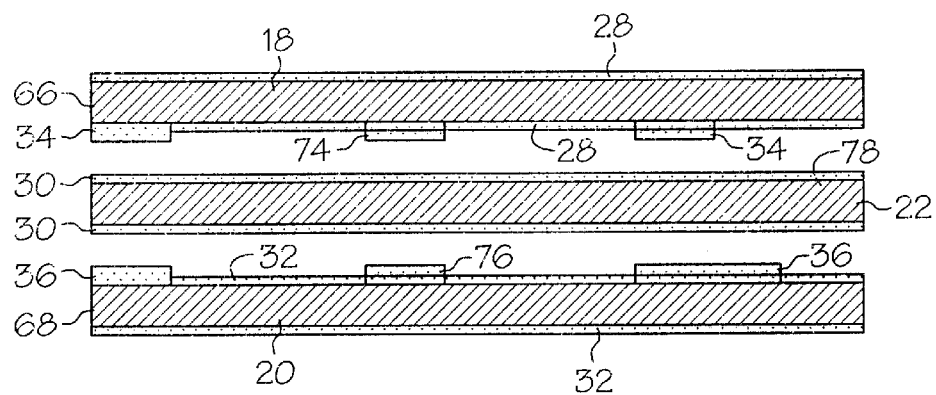

Next, as shown in FIG. 4, a spacer wafer 78 having an oxide layer 30 formed thereon is located between the upper and lower wafers 66, 68. The oxide layer 30 is preferably about 1000 Angstroms thick. Besides the thickness of the oxide layer 30, the spacer wafer 78 preferably has the same specifications as the upper and lower wafers 66, 68 described above. The upper and lower wafers 66, 68 and spacer wafer 78 are preferably formed from wafers cut from a commercially available ingot. It is preferably to use such a wafer to ensure that the doping of the silicon of the diaphragms 18, 20 and spacer 22 are uniform. A commercially available ingot is typically formed from a bath of uniformly mixed, doped silicon, thus providing high quality wafers.

Figure 5:
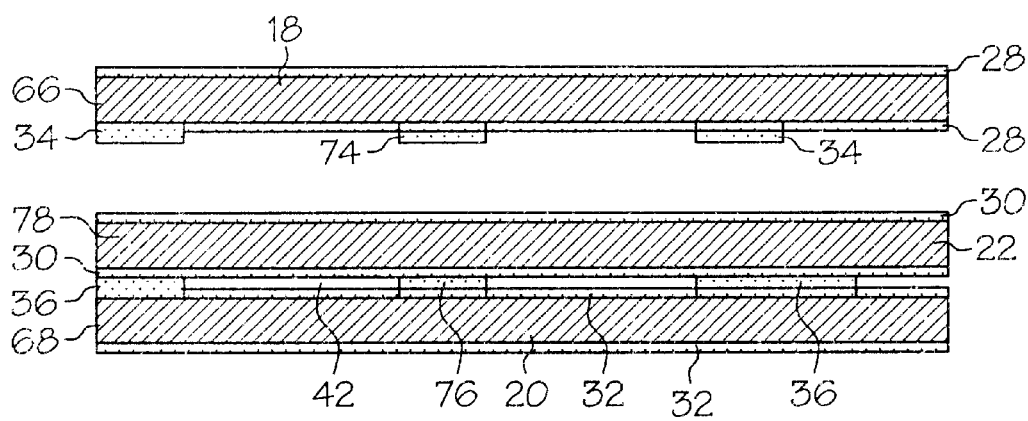

The upper and lower wafers 66, 68 are then oxidized to grow a thin oxide layer 28, 32 (i.e. about 1,000 Angstroms thick) to electrically isolate the wafers 66, 68. Next, as shown in FIG. 5 the spacer wafer 78 is bonded to the lower wafer 68, preferably by silicon fusion bonding, although a variety of other joining methods such as anodic bonding, direct-wafer room temperature bonding, metal to metal eutectic, adhesive glue, solder or other attachment methods may be used without departing from the scope of the invention. The spacer wafer 78 is bonded to the inwardly-extending portions 36 and post base 76 of the lower wafer 68. In order to seal the lower cavity 42 between the spacer wafer 78 and the lower wafer 68, the wafers are preferably contacted in a vacuum environment. Alternately, the fluid desired in the lower cavity 42 as added before or after bonding.

Figure 6:
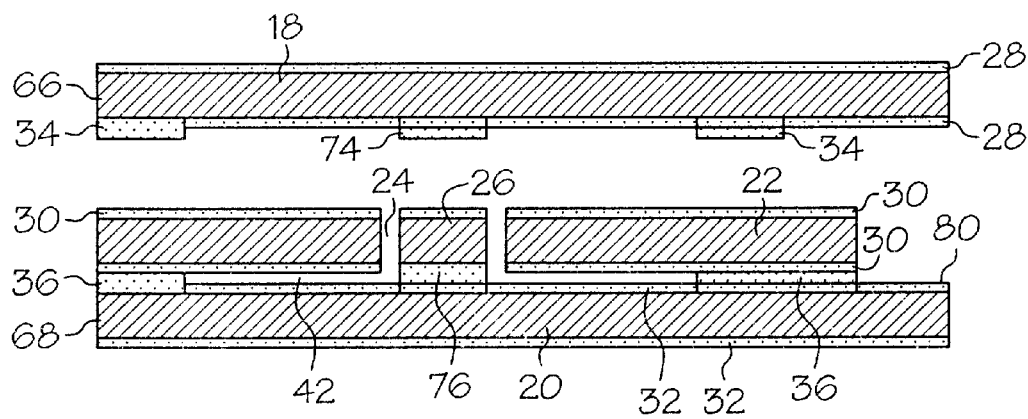

Next, as shown in FIG. 6, the spacer wafer 78 is bulk etched (preferably using deep reactive ion etching ("DRIE")) followed by an oxide RIE etch of the lower, exposed oxide layer 30 to uncover the surface 80 on the lower wafer 68 which will receive the lower bonding pad 52. The spacer wafer 78 is also etched to define the post 26, by etching spacer wafer 78 to define the post 26 and separate it from the spacer wafer. If desired, a plurality of posts 26 (not shown) may be etched at this time.

Figure 7:
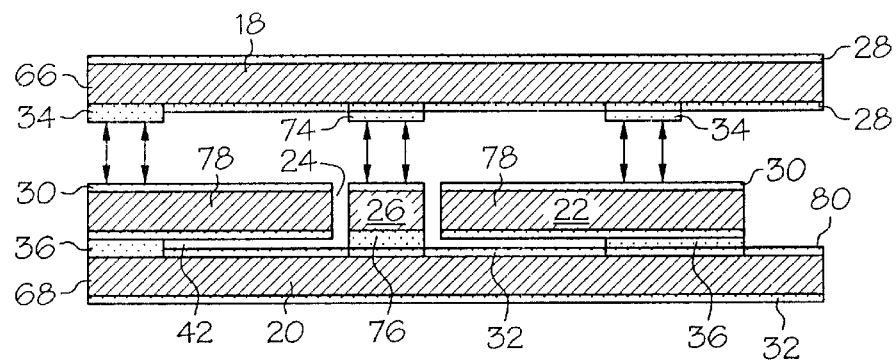
Figure 8:
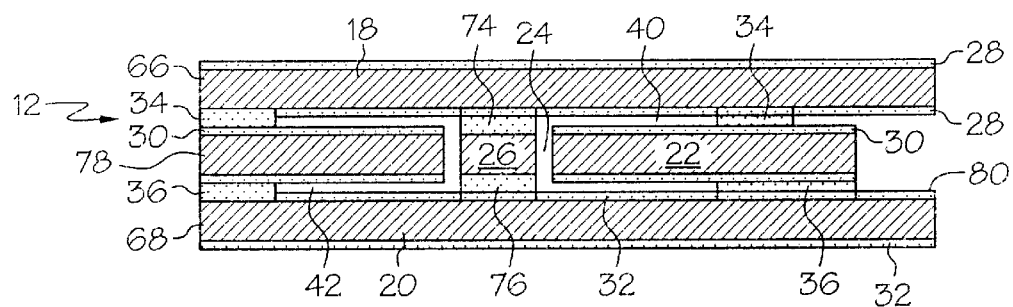
Figure 9:
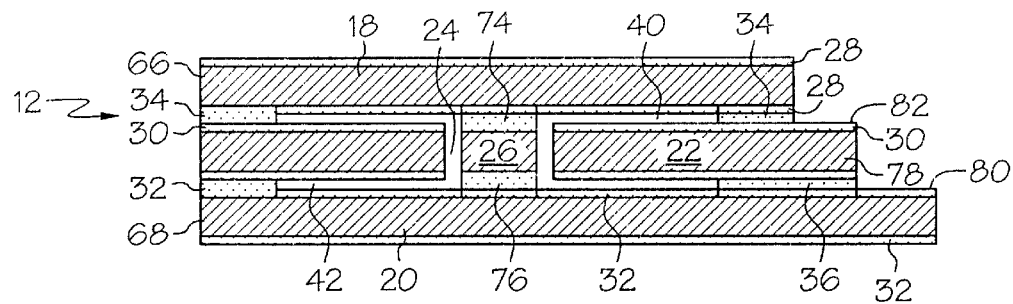

Next, as shown in FIGS. 7–8, the upper wafer 66 is bonded to the spacer wafer 78, which completes the mechanical coupling of the upper and lower diaphragms 18, 20 so that the upper and lower diaphragms move together under an applied differential pressure. This bonding step is also preferably carried out in a vacuum. This helps to ensure the upper 40 and lower 42 cavities are sealed, which minimizes sensor performance variation due to environmental changes. For example, when the upper and lower cavities 40, 42 are sealed, humidity or temperature variations in the surrounding environment do not affect the dielectric constant of the sealed media in the cavities. Besides a vacuum, the upper and lower cavities 40, 42 may be filled with a dry, inert gas.

The vertical and horizontal alignment of the upper and lower wafers 66, 68 and spacer wafer 78 is critical for packaging and performance of the. sensor 10, and therefore, some method of ensuring alignment during the bonding steps is required. This alignment can be achieved using an infrared or other imaging system available with commercial bonding equipment, or by custom machining a bonding fixture that mechanically aligns the wafers.

Figure 10:
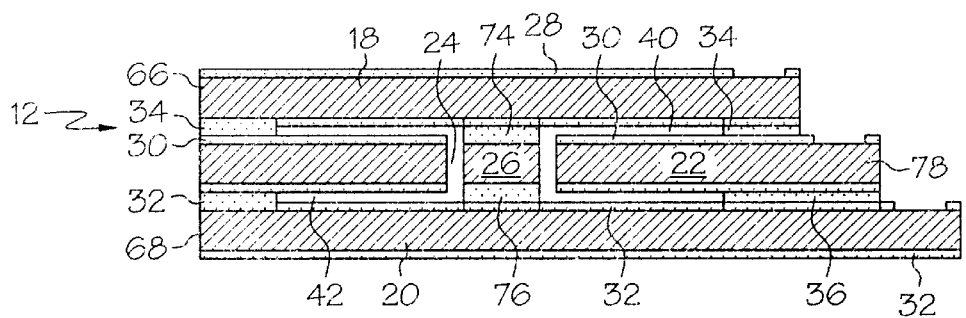

After the upper wafer 66 is bonded to the spacer wafer 78, the upper wafer is etched, preferably using DRIE, to uncover the surface 82 of the spacer wafer 78 which receives the spacer bonding pad 50. Next, as shown in FIG. 10, a portion of the oxide layers 28, 30, 32 of the upper 66, spacer 78, and lower wafers 68 are etched to expose the conductive (silicon core) portions of the wafers (i.e., portions 80 and 82 of the spacer wafer and lower wafer are etched).

This etching step is preferably performed through a shadow mask using an anisotropic dry etching technique, such as reactive ion etching.

Figure 11:
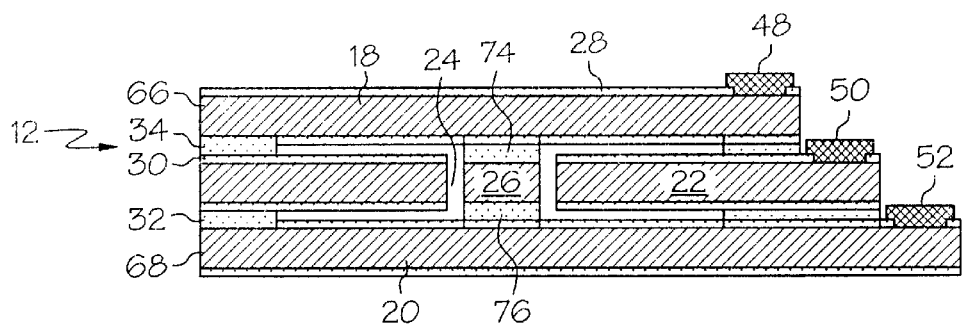

As shown in FIG. 11, the bonding pads 48, 50, 52 are then deposited onto the newly etched surfaces, preferably by sputtering a one micron thick layer of aluminum, nickel, aluminum-silicon-copper alloy, or other metalization through a shadow mask. The top layer of each bonding pad 48, 50, 52 preferably includes nickel to facilitate soldering of the wires 54 to the bonding pads. The sputtering is followed by a sinter step to ensure ohmic contact between the bonding pads 48, 50, 52 and the diaphragms 18, 20 and spacer 22.

Figure 12:
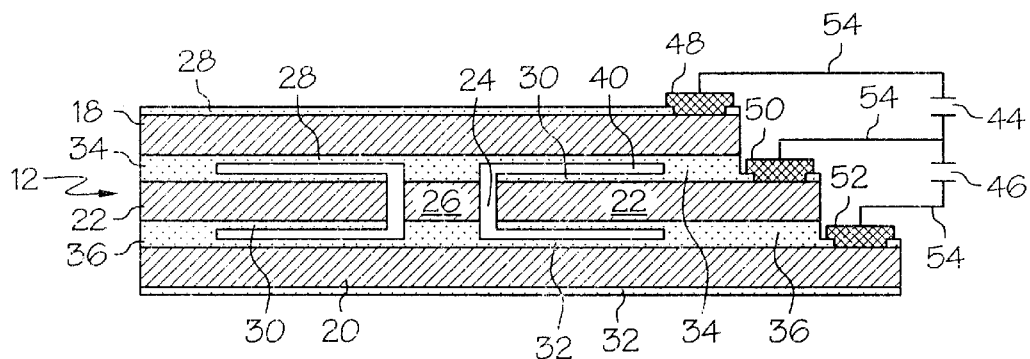

The transducer 12 is then separated from the body of the wafers 66, 68, 78, such as by dicing, and the wires 54 are connected to the bonding pads 48, 50, 52 as shown in FIG. 12. The transducer may be mounted into the housing 16.

The thickness of the diaphragms 18, 20 is determined by the thickness of the wafers 66, 68 used to form the diaphragms, and the gap between the diaphragms and the spacer is determined by the thickness of the inwardly-extending portions 34, 36. Because these dimensions can be tightly controlled (i.e. gaps of 2 microns or less may be provided, thereby providing a cavity 40, 42 thickness of 2 microns or less), superior dimensional accuracy and uniformity of the sensor 10 can be achieved. The inwardly-extending portions 34, 36 which act as spacers may also be located on the diaphragm 22, or can be separate spacer components.

As noted earlier, the sealed upper and lower cavities 40, 42 provide a stable dielectric constant for the capacitors 44, 46, and provide an isolated capacitor gap. Furthermore, any temperature, humidity, or other system/environment changes effect both capacitors equally, and therefore an accurate pressure measurement is provided under varying environmental conditions. Additionally, because the upper and lower cavities 40, 42 are preferably filled with a gas or a vacuum, the gas (or vacuum) is resistant to expansion and/or contraction, as compared to a liquid filled cavity. This advantage can be provided by the present invention because the upper and lower cavities 40, 42 do not transmit pressures, and therefore gas (or vacuum) may be used instead of liquids. Furthermore, because the upper and lower diaphragms 18, 20 are coupled together, the fluids in the upper and lower cavities 40, 42 are not compressed when one of the upper or lower diaphragms is moved by a pressure differential. Of course, a variety of methods for coupling the diaphragms together for common movement may be used, and the post 26 disclosed herein is illustrative of only a single structure for coupling the diaphragms. Furthermore, although the spacer is preferably located between the first and second diaphragms, it may be located in a variety of locations, so long as it forms the first and second capacitor with the first and second diaphragms.

Additionally, because the sensor readout is provided by a differential measurement of two changing capacitors 44, 46 on the same die, the need for a separate reference die (i.e., a reference capacitor) is eliminated, and the pressure sensor 10 provides higher sensitivity than a single variable, single fixed capacitor readout scheme. Each capacitor 44, 46 provides a readout of the differential pressure, which provides redundancy and higher accuracy of the measured pressure. Because the capacitance of one of the capacitors 44, 46 increases while the capacitance of the other capacitor 44, 46 decreases, the net change in capacitance is larger than if a single capacitor is used, which increases the sensitivity and accuracy of measurement.

Due to the relatively small size of the sensor 10 and the presence of the post 26, the sensor is relatively stiff and robust, and can withstand a high common mode pressure. The relatively large surface area and thickness of the diaphragms 18, 20 provides a higher capacitance and lower hysteresis compared to thin-filmed capacitive diaphragms. Because the surfaces of the diaphragms 18, 20 that come in contact with the first and second fluids are coated with an oxide 28, 32, the pressure sensor 10 is compatible with a wide range of medias.

The manufacturing methods disclosed herein provides a high degree of flexibility in manufacturing transducers/sensors. For example, the manufacturing steps shown in FIGS. 2–4 may be carried out for a number and variety of wafers 66, 68, 78. The diaphragm wafers 66, 68 and spacer wafers 78 may then be stored for future use. Once an order is received from a customer, the stored diaphragm wafers and spacer wafers may be identified and pulled from storage, bonded together and processed in the desired manner to form a sensor having the desired characteristics. This enables the manufacturer to have a highly flexible manufacturing process, and reduces the response time required to produce sensors.

Having described the invention in detail and by reference to the preferred embodiments, it will apparent that modifications and variations thereof are possible without departing from the scope of the invention.

What is claimed is:

1. A pressure sensor for measuring the differential pressure of a first and a second fluid comprising:
    a housing having an internal opening;
    a first diaphragm disposed in said opening and located to be exposed to said first fluid; and
    a second diaphragm disposed in said opening and located to be exposed to said second fluid, said first diaphragm and said second diaphragm each being made of a conductive material and being coupled together such that the differential pressure of said first and second fluids deflects said first and second diaphragms in the same direction, and wherein the deflection of said first and second diaphragms can be sensed to determine said differential pressure.

2. The pressure sensor of claim 1 further comprising an electrically conductive spacer located between said first and second diaphragms, said spacer forming a first capacitor with said first diaphragm and a second capacitor with said second diaphragm, and wherein deflection of said first or said second diaphragm causes a change in capacitance of said first or second capacitor, respectively.

3. The pressure sensor of claim 2 wherein said first and second diaphragms isolate said spacer from said first and second fluids, respectively.

4. The pressure sensor of claim 2 further comprising a post connecting said first and second diaphragms such that said first and second diaphragms are deflected about equal distances by said differential pressure.

5. The pressure sensor of claim 4 wherein said spacer includes a central opening and said post extends through said central opening.

6. The pressure sensor of claim 2 wherein said spacer is coupled to an outer edge of said first and second diaphragms.

7. The pressure sensor of claim 2 further comprising a first spacer portion located between said spacer and said first diaphragm to maintain a gap between said first diaphragm and said spacer, and a second spacer portion located between said spacer and said second diaphragm to maintain a gap between said second diaphragm and said spacer.

8. The pressure sensor of claim 7 wherein each spacer portion is located adjacent an outer edge of the respective diaphragm.

9. The pressure sensor of claim 2 wherein said spacer includes a bonding surface that is not covered by said first diaphragm and said second diaphragm includes a bonding surface that is not covered by said first diaphragm or by said spacer.

10. The pressure sensor of claim 1 further comprising a processor electrically coupled to said first diaphragm, said second diaphragm and said spacer for monitoring the capacitance of said first and second capacitors.

11. The pressure sensor of claim 1 wherein said first and second diaphragms are made of doped silicon.

12. The pressure sensor of claim 11 wherein said first and second diaphragms each include an electrically insulating outer layer.

13. The pressure sensor of claim 1 wherein said first and second diaphragms are made of relatively thin, deflectable silicon having generally uniform doping.

14. The pressure sensor of claim 1 wherein said housing includes an first fluid inlet opening that allows said first fluid to flow therethrough and exert pressure upon said first diaphragm, and a second fluid inlet opening that allows said second fluid to flow therethrough and exert pressure upon said second diaphragm.

15. A pressure transducer for measuring the differential pressure of a first and a second fluid comprising:

a first diaphragm located to be exposed to said first fluid;

a spacer coupled to said first diaphragm; and a second diaphragm coupled to said spacer and located to be exposed to said second fluid, said spacer, said first diaphragm and said second diaphragm each being made of a conductive material such that said first diaphragm and said spacer form a first capacitor and said second diaphragm and said spacer for a second capacitor, said first and second diaphragms being coupled together such that the differential pressure of said first and second fluids deflects said first and second diaphragms in the same direction, and wherein the deflection of said first and second diaphragms causes a change in capacitance in said first and second capacitors.

16. The pressure transducer of claim 15 wherein said spacer is located between said first and second diaphragms and includes a central opening, and wherein said transducer includes a post coupled to said first and second diaphragms and extending through said central opening to connect said first and second diaphragms together.

17. A method for manufacturing a capacitive differential pressure sensor comprising the steps of:

providing a first conductive diaphragm;

providing a conductive spacer;

providing a second conductive diaphragm;

mounting said first and second diaphragms and said spacer such that said spacer forms a first capacitor with said first diaphragm and a second capacitor with said second diaphragm;

connecting said first and second diaphragms together; and mounting said first and second diaphragms and said spacer in a housing such that said first diaphragm can be exposed to a first fluid and said second diaphragm can be exposed to a second fluid, said first diaphragm and said second diaphragm being coupled together such that the differential pressure between said first and second fluids deflects said first and second diaphragms in the same direction.

18. The method of claim 17 wherein said conductive spacer is located between said first and second diaphragms.

19. The method of claim 17 wherein said connecting step includes connecting said spacer to said first diaphragm, etching said spacer to form a post, and connecting said post to said second diaphragm such that said post couples said first and second diaphragms together.

20. The method of claim 19 wherein said post is etched such that said post is separated from said spacer.

21. The method of claim 20 wherein said etching is deep reactive ion etching.

22. The method of claim 17 wherein said first and second diaphragms each include an inwardly-extending portion, and wherein said first and second diaphragms are attached to said spacer at said inwardly-extending portions.

23. The method of claim 22 wherein said first and second diaphragms are attached to said spacer such that said inwardly-extending portions maintain a gap between said diaphragms and said spacer.

24. The method of claim 22 wherein said first and second diaphragms each include an oxide layer formed thereon, and wherein said inwardly-extending portions are formed by etching said oxide layers.

25. The method of claim 22 wherein each inwardly-extending portion is located at an outer edge of the respective diaphragm.

26. The method of claim 17 wherein said first and second diaphragms are each bonded to said spacer, and wherein said first and second diaphragms are each aligned with said spacer before said bonding.

27. The method of claim 17 further comprising the steps of etching said spacer such that at least part of said first diaphragm is not covered by said spacer, and etching said second diaphragm such that at least part of said spacer and said first diaphragm are not covered by said second diaphragm.

28. The method of claim 17 further comprising the step of electrically connecting said first diaphragm, said second diaphragm and said spacer to a processor.

29. The method of claim 17 wherein said first and second diaphragms and said spacer are made of doped silicon.

30. The method of claim 29 wherein said first and second diaphragms are made of relatively thin, deflectable silicon having generally uniform doping.

31. The method of claim 17 wherein said first diaphragm is part of a first wafer, said second diaphragm is part of a second wafer, and said spacer is part of a spacer wafer, and wherein a plurality of sensors are batch processed on said first wafer, said second wafer and said spacer wafer.

32. The method of claim 17 further comprising the step of growing a insulating layer on said first diaphragm, said second diaphragm, and said spacer before said connecting step.

33. A method for manufacturing a capacitive differential pressure transducer comprising the steps of:
provide a first conductive diaphragm;
bonding a conductive spacer to said first diaphragm such that said conductive spacer is spaced apart from and forms a first capacitor with said first diaphragm;
etching a post in said spacer; and
bonding a second conductive diaphragm to said conductive spacer and said post, wherein said second diaphragm is spaced apart from and forms a second capacitor with said spacer.

34. The method of claim 33 wherein said post is uncoupled from said spacer in said etching step.

35. The method of claim 33 wherein said first diaphragm, said second diaphragm and said spacer are made of doped silicon.

* * * * *